Patented Mar. 25, 1952

2,590,737

UNITED STATES PATENT OFFICE 2,590,737

VULCANIZATION OF RUBBER WITH AROMATIC SULFONAMIDE ACTIVATORS

Andrew Tomlin, Hudson, Ohio, assignor to Monsanto Chemical Company, St. Louis, Mo., a corporation of Delaware No Drawing. Application July 12, 1949,
Serial No. 104,395

16 Claims. (Cl. 260—79.5)

This invention relates to the vulcanization of rubber. More particularly it relates to the vulcanization of rubber with a new class of activators of vulcanization acceleration and to the vulcanized products resulting thereby.

In the compounding of rubber, both natural and synthetic, improvements have ben constantly sought, particularly in respect to the more efficient and more economical use of vulcanization accelerators. While many accelerators, per se, produce vulcanizates having acceptable physical properties, it has long been known that by the incorporation into the compounded stock of activators of acceleration such as dibutyl ammonium oleate in addition to a primary organic vulcanization accelerator, greater ease in processing and a better vulcanizate is obtained.

It is an object of this invention to provide a class of activators which are capable of assisting primary organic vulcanization accelerators possessing inherent weaknesses, such as inefficient vulcanizing effect, limited solubility, and poor dispersibility in rubber stocks, thus causing uneven cures which in turn result in non-uniform properties and erratic performance in service. It is also an object of this invention to decrease the time of vulcanization. A further object is to provide a wider choice of curing conditions such that a series of combinations varying in scorch and curing properties may be obtained. For example, the ratio of activator to accelerator may vary depending upon the type of rubber, type of stock, temperature of cure, time of cure, the particular vulcanization accelerator, and the objectives of the compounder, that is whether a low or high modulus is desired or a short or long cure is required. Other objects will appear hereinafter.

It has been found in accordance with this invention that the above mentioned objects are attained by vulcanizing a vulcanizable rubber stock in which has been incorporated in addition to a primary organic vulcanization accelerator an aromatic sulfonamide of the general formula

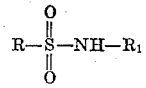

where R is an aromatic radical such as a phenyl, tolyl, xylyl, xenyl, or naphthyl radical and where $R_1$ is a hydrogen atom or an alkyl group such as a methyl, ethyl, propyl, isopropyl, or butyl radical, or a higher alkyl group such as heptyl or ethyl hexyl.

The new activators of themselves possess little if any accelerating activity, however, when employed in conjunction with such primary organic vulcanization accelerators as the aromatic and non-aromatic substituted thiazole sulfides, and thiazole sulfenamides, and other thiazole type accelerators, the dithiocarbamates, and the thiuram mono- and disulfides the accelerating action is unexpectedly increased beyond that which would be expected from the mere combined use of the two substances.

Although all the aromatic sulfonamides of the above described general formula produce activation, the best results are obtained with those sulfonamides wherein $R_1$ is a hydrogen atom or an alkyl group containing less than four carbon atoms. As specific examples of this group are the toluene (or tolyl) sulfonamides, benzene (or phenyl) sulfonamide, N-methyl o- and p-toluene sulfonamide, N-isopropyl benzene sulfonamide, N-isopropyl o- and p-toluene sulfonamide, and various mixtures, particularly the eutectic mixtures, thereof.

As exemplary of the activating properties of the aromatic sulfonamides, the following stocks were compounded comprising

| Stocks | Parts by weight— | | | | | | | | |
|---|---|---|---|---|---|---|---|---|---|
| | A | B | C | D | E | F | G | H | I |
| Smoked sheets rubber | 100 | 100 | 100 | 100 | 100 | 100 | 100 | 100 | 100 |
| Zinc oxide | 35 | 35 | 35 | 35 | 35 | 35 | 5 | 5 | 5 |
| Whiting | | | | | | | 50 | 50 | 50 |
| Sulfur | 1.3 | 1.3 | 1.3 | 1.3 | 1.3 | 1.3 | 3 | 3 | 3 |
| Stearic acid | 1.0 | 1.0 | 1.0 | 1.0 | 1.0 | 1.0 | 1.0 | 1.0 | 1.0 |
| Benzothiazyldisulfide | 0.6 | 0.6 | 0.6 | | | | | | |
| N-cyclohexyl 2-benzothiazylsulfenamide | | | | 0.75 | 0.75 | 0.75 | 0.75 | 0.75 | 0.75 |
| Eutectic mixture containing 40% ortho toluene sulfonamide and 60% para toluene sulfonamide | | 0.5 | 1.0 | | 0.5 | 1.0 | | 0.5 | 1.0 |

The above stocks so compounded were vulcanized in the usual manner by heating in a press for different periods of time. The physical properties of the respective cured stocks are set forth below:

Table I

| Stock | Minutes Cure | Modulus in lbs./in.² at elongations of— | | | Tensile at Break lbs./in.² | Ultimate Elongation Per cent |
|---|---|---|---|---|---|---|
| | | 300% | 500% | 700% | | |
| A | 10@142°C | (¹) | (¹) | (¹) | | |
| C | 10@142°C | 80 | 245 | 840 | 1,155 | 760 |
| A | 15@142°C | (¹) | (¹) | (¹) | | |
| B | 15@142°C | 80 | 220 | 790 | 1,230 | 800 |
| C | 15@142°C | 130 | 393 | 1,233 | 2,103 | 800 |
| A | 20@142°C | 70 | 235 | 830 | 1,715 | 840 |
| B | 20@142°C | 110 | 400 | 1,215 | 1,960 | 810 |
| C | 20@142°C | 120 | 375 | 1,220 | 2,010 | 810 |
| D | 15@142°C | 120 | 325 | 1,195 | 2,195 | 830 |
| E | 15@142°C | 180 | 590 | 2,070 | 2,910 | 763 |
| F | 15@142°C | 230 | 890 | 3,013 | 3,463 | 743 |
| G | 15@138°C | 165 | 490 | 1,220 | 1,620 | 780 |
| H | 15@138°C | 376 | 1,130 | 3,350 | 3,350 | 700 |
| I | 15@138°C | 384 | 1,060 | -------- | 3,240 | 690 |

¹ No cure.

As further exemplary of the activating properties of aromatic sulfonamides, the following synthetic rubber stocks were compounded comprising

| Stocks | Parts by weight | | |
|---|---|---|---|
| | K | L | M |
| GR-S rubber | 100 | 100 | 100 |
| Carbon black | 40 | 40 | 40 |
| Zinc oxide | 3 | 3 | 3 |
| Sulfur | 2 | 2 | 2 |
| Mercaptobenzothiazole | 1 | 1 | 1 |
| Eutectic mixture containing: 40% ortho toluene sulfonamide 60% para toluene sulfonamide | | 0.5 | 1.0 |

The above synthetic rubber stocks so compounded were vulcanized in the usual manner by heating in a press for different periods of time at 142° C. The physical properties of the respective cured stocks are set forth below:

Table II

| Stock | Minutes cure at 142° C. | Modulus in lbs./in.² at elongations of— | | Tensile at Break in lbs./in.² | Ultimate Elongation percent |
|---|---|---|---|---|---|
| | | 300% | 500% | | |
| K | 30 | 370 | 666 | 683 | 510 |
| L | 30 | 323 | 703 | 860 | 590 |
| M | 30 | 370 | 813 | 956 | 600 |
| K | 45 | 473 | 996 | 1,116 | 586 |
| L | 45 | 470 | 1,090 | 1,506 | 643 |
| M | 45 | 645 | 1,410 | 1,725 | 600 |
| K | 60 | 663 | 1,413 | 1,520 | 523 |
| L | 60 | 570 | 1,416 | 2,076 | 670 |
| M | 60 | 870 | 1,820 | 2,306 | 616 |

As exemplary of the activating properties of N-alkyl substituted aromatic sulfonamides the following gum stocks were compounded comprising

| | Parts by weight | | | |
|---|---|---|---|---|
| | N | O | P | Q |
| Smoked sheets rubber | 100 | 100 | 100 | 100 |
| Zinc oxide | 35 | 35 | 35 | 35 |
| Sulfur | 1.3 | 1.3 | 1.3 | 1.3 |
| Stearic acid | 1.0 | 1.0 | 1.0 | 1.0 |
| Benzothiazyl disulfide | 0.6 | 0.6 | 0.6 | 0.6 |
| N-ethyl-p-toluene sulfonamide | | 1.0 | | |
| N-ethyl-benzene sulfonamide | | | 1.0 | |
| N-isopropyl-benzene sulfonamide | | | | 1.0 |

The above stocks so compounded were vulcanized in the usual manner by heating in a press for different periods of time at 142° C. The physical properties of the respective cured stocks are set forth below:

Table III

| Stock | Minutes cure at 142° C | Modulus in lbs./in.² at elongations of— | | | Tensile at Break in lbs./in.² | Ultimate Elongation percent |
|---|---|---|---|---|---|---|
| | | 300% | 500% | 700% | | |
| N | 15 | (¹) | (¹) | (¹) | | |
| O | 15 | 110 | 250 | 855 | 1,210 | 780 |
| P | 15 | 140 | 330 | 1,070 | 1,685 | 795 |
| Q | 15 | 110 | 305 | 910 | 1,010 | 730 |
| N | 30 | (¹) | (¹) | (¹) | | |
| O | 30 | 140 | 417 | 1,340 | 2,197 | 793 |
| P | 30 | 143 | 463 | 1,550 | 2,373 | 793 |
| Q | 30 | 170 | 517 | 1,640 | 2,213 | 770 |
| N | 45 | 137 | 427 | 1,573 | 2,287 | 783 |
| O | 45 | 150 | 390 | 1,310 | 2,320 | 807 |
| P | 45 | 173 | 493 | 1,723 | 2,507 | 787 |
| Q | 45 | 160 | 470 | 1,630 | 2,605 | 805 |

¹ No cure.

It is obvious from the above data the aromatic sulfonamides are a class of compounds which exert a marked activating effect on the cure rate. The new activators disperse readily and rapidly in rubber stocks, both natural and synthetic.

Smaller amounts of the aromatic sulfonamide activators may be employed than those indicated in the examples. Amounts as small as 0.2% on the rubber of aromatic sulfonamide exhibit activating properties. Amounts higher than those specifically shown, as for example 2%, may be employed depending upon the conditions of compounding and the objectives of the compounder.

By the term "a rubber" as employed in the specification and appended claims, unless otherwise modified, is meant natural as well as synthetic rubbers which are capable of vulcanization when heated with sulfur and includes latices and reclaims of such materials whether or not admixed with pigments, fillers, softeners, antioxidants, etc.

While specific embodiments of the invention have been described herein, it will be understood that the invention is not so limited but that various modifications may be made therein without departing from the spirit of the invention or scope of the appended claims.

What is claimed is:

1. The method of vulcanizing a rubber which comprises heating a rubber, sulfur, and a primary organic sulfur containing vulcanization accelerator in the presence of an aromatic sulfonamide of the formula $$R-\underset{\underset{O}{\|}}{\overset{\overset{O}{\|}}{S}}-NH-R_1$$

where R is selected from the group consisting of unsubstituted and methyl substituted aromatic hydrocarbon radicals containing not more than 12 carbon atoms and where $R_1$ is selected from the group consisting of hydrogen atoms and alkyl radicals containing not more than 8 carbon atoms.

2. The method of vulcanizing a rubber which comprises heating a rubber, sulfur, and a primary organic sulfur containing vulcanization accelerator in the presence of an aromatic sulfonamide of the formula $$R-\underset{\underset{O}{\|}}{\overset{\overset{O}{\|}}{S}}-NH-R_1$$

where R is selected from the group consisting of unsubstituted and methyl substituted aromatic hydrocarbon radicals containing not more than 12 carbon atoms and where $R_1$ is an alkyl group containing less than four carbon atoms.

3. The method of vulcanizing a rubber which comprises heating a rubber, sulfur, and a primary organic sulfur containing vulcanization accelerator in the presence of an aromatic sulfonamide of the formula $$R-\underset{\underset{O}{\|}}{\overset{\overset{O}{\|}}{S}}-NH_2$$

where R is selected from the group consisting of unsubstituted and methyl substituted aromatic hydrocarbon radicals containing not more than 12 carbon atoms.

4. The method of vulcanizing a rubber which comprises heating a rubber, sulfur, and a primary organic sulfur containing vulcanization accelerator in the presence of a toluene hydrocarbon sulfonamide of the structure $C_7H_7SO_2NH_2$.

5. The method of vulcanizing a rubber which comprises heating a rubber, sulfur, and a primary organic sulfur containing vulcanization accelerator in the presence of para toluene sulfonamide.

6. The method of vulcanizing a rubber which comprises heating a rubber, sulfur, and a primary organic sulfur containing vulcanization accelerator in the presence of ortho toluene sulfonamide.

7. The method of vulcanizing a rubber which comprises heating a rubber, sulfur, and a primary organic sulfur containing vulcanization accelerator in the presence of an N-ethyl toluene sulfonamide.

8. The method of vulcanizing a rubber which comprises heating a rubber, sulfur, and a primary organic sulfur containing vulcanization accelerator in the presence of N-ethyl para toluene sulfonamide.

9. The vulcanized rubber product obtained by heating a rubber, sulfur, and an organic sulfur containing vulcanization accelerator in the presence of a small amount of an aromatic sulfonamide of the formula $$R-\underset{\underset{O}{\|}}{\overset{\overset{O}{\|}}{S}}-NH-R_1$$

where R is selected from the group consisting of unsubstituted and methyl substituted aromatic hydrocarbon radicals containing not more than 12 carbon atoms and where $R_1$ is selected from the group consisting of hydrogen atoms and alkyl radicals containing not more than 8 carbon atoms.

10. The vulcanized rubber product obtained by heating a rubber, sulfur, and an organic sulfur containing vulcanization accelerator in the presence of a small amount of an aromatic sulfonamide of the formula $$R-\underset{\underset{O}{\|}}{\overset{\overset{O}{\|}}{S}}-NH-R_1$$

where R is selected from the group consisting of unsubstituted and methyl substituted aromatic hydrocarbon radicals containing not more than 12 carbon atoms and where $R_1$ is an alkyl group containing less than four carbon atoms.

11. The vulcanized rubber product obtained by heating a rubber, sulfur, and an organic sulfur containing vulcanization accelerator in the presence of a small amount of an aromatic sulfonamide of the formula $$R-\underset{\underset{O}{\|}}{\overset{\overset{O}{\|}}{S}}-NH_2$$

where R is selected from the group consisting of unsubstituted and methyl substituted aromatic hydrocarbon radicals containing not more than 12 carbon atoms.

12. The vulcanized rubber product obtained by heating a rubber, sulfur, and an organic sulfur containing vulcanization accelerator in the presence of a small amount of a toluene hydrocarbon sulfonamide of the structure $C_7H_7SO_2NH_2$.

13. The vulcanized rubber product obtained by heating a rubber, sulfur, and an organic sulfur containing vulcanization accelerator in the presence of a small amount of para toluene sulfonamide.

14. The vulcanized rubber product obtained by heating a rubber, sulfur, and an organic sulfur containing vulcanization accelerator in the presence of a small amount of ortho toluene sulfonamide.

15. The vulcanized rubber product obtained by heating a rubber, sulfur, and an organic sulfur containing vulcanization accelerator in the presence of a small amount of an N-ethyl toluene sulfonamide.

16. The vulcanized rubber product obtained by heating a rubber, sulfur, and an organic sulfur containing vulcanization accelerator in the presence of a small amount of N-ethyl para toluene sulfonamide.

ANDREW TOMLIN.

REFERENCES CITED

The following references are of record in the file of this patent:

UNITED STATES PATENTS

| Number | Name | Date |
|---|---|---|
| 1,924,567 | Orthner et al. | Aug. 29, 1933 |